(12) United States Patent  
Weiss et al.

(10) Patent No.: US 11,836,975 B1  
(45) Date of Patent: Dec. 5, 2023

(54) SYSTEM AND METHOD FOR MAPPING LAND PARCELS USING COMPUTER PROCESSES AND IMAGES OF THE LAND PARCELS

(71) Applicant: Geo Data AG, Frauenfeld (CH)

(72) Inventors: Benny Weiss, Gane-Tikva (IL); Gal Avraham, Rehovot (IL); Dan Kuida, Benalmadena Costa Malaga (ES)

(*) Notice: Subject to any disclaimer, the term of this patent is extended or adjusted under 35 U.S.C. 154(b) by 0 days.

(21) Appl. No.: 18/144,202

(22) Filed: May 7, 2023

(51) Int. Cl.  
*G06V 20/17* (2022.01)

(52) U.S. Cl.  
CPC .................... *G06V 20/17* (2022.01)

(58) Field of Classification Search  
CPC ............................ G06V 20/17; G06V 10/245  
See application file for complete search history.

(56) References Cited

U.S. PATENT DOCUMENTS

2022/0215632 A1\* 7/2022 Liang .................. G06V 10/761

\* cited by examiner

*Primary Examiner* — Sam Bhattacharya  
(74) *Attorney, Agent, or Firm* — ALPHAPATENT ASSOCIATES, LTD; Daniel J. Swirsky

(57) ABSTRACT

Processing photogrammetry data that represents parcels by computing a real-world distance between a first location representing a location of a specific separation point of a specific subarea included in the area as appearing in the initial representation and a second location that represents a location of the same specific separation point as appearing in the photogrammetry data, defining a specific separation point as identifying incorrect if the real-world distance exceeds a reference distance dictated by accuracy level, intersecting subareas of the subarea to which the examined vertex belongs, measuring a distance between the examined vertex and a closest point in the intersecting subarea, marking the examined vertex as an error if the intersecting distance exceeds a threshold, computing angles for edges defining subarea boundaries, and removing a vertex between two subsequent edges having an angle between them that satisfies a condition representing that the subsequent edges constitute a single line.

11 Claims, 5 Drawing Sheets

SYSTEM AND METHOD FOR MAPPING LAND PARCELS USING COMPUTER PROCESSES AND IMAGES OF THE LAND PARCELS

FIELD

The invention relates generally to the field of mapping land parcels using computer processes and images of the land parcels.

BACKGROUND

A land parcel, which is representative of one type of polygon/area for example, may be defined in accordance with some embodiments by three or more vertices/coordinates. In some embodiments, a polygon may be identified by a representative (e.g., best available) vertex and/or coordinate. According to some embodiments, a polygon may be defined as a closed shape defined by a connected sequence of x,y coordinate pairs (Vertex/Vertices).

Many times, land parcels are mapped by sending human beings to the area required to be mapped. Human beings need to carry measuring equipment, carry the equipment in the area, and hope that the measurements are accurate. Such a process can take years when the mapped areas are big, for example, larger than 5,000 square kilometers, but it is government's interest to map the land parcel in order to identify the exact size of sub-areas in the parcel that belong to each owner, for example for taxation, calculations of compensations when there is a plan to develop the area and many more. Thus, there is a need to find accurate processes to map the land parcels.

SUMMARY

In one aspect of the invention a method is provided for processing photogrammetry data that represents parcels, the method comprising receiving an initial representation of an area divided into subareas by separation points' receiving photogrammetry data of the area based on the initial representation of the area' computing a real-world distance between a first location representing a location of a specific separation point of a specific subarea included in the area as appearing in the initial representation and a second location that represents a location of the same specific separation point as appearing in the photogrammetry data' defining a specific separation point as incorrect in case the real-world distance exceeds a reference distance dictated by the accuracy level' for each subarea of the subareas, examine one or more examined vertices identifying one or more intersecting subareas of the subarea to which the examined vertex belongs' measuring a distance between the examined vertex and a closest point in the intersecting subarea' marking the examined vertex as an error if the intersecting distance exceeds a threshold' computing the azimuths or reference angles for all the edges defining boundaries of the subarea' determining whether or not two subsequent edges have an angle between them that satisfies a condition representing that the subsequent edges constitute a single line' removing a vertex between the two subsequent edges from a list of vertices that define the subarea.

In some cases, the initial representation of the area is provided from an aerial survey. In some cases, the photogrammetry data represents initial suggestions for actual boundaries of subareas in the area. In some cases, the accuracy level is defined by one or more adjustable parameters. In some cases, the one or more adjustable parameters comprise a lower Threshold Distance that represents the level of accuracy of the Photogrammetric mapping. In some cases, the one or more adjustable parameters comprise a Maximum allowed Gap representing an allowed distance between a vertex location in the initial representation and a Photogrammetry object vertex.

In some cases, the method further comprises correcting the location of the specific separation point that was marked as incorrect. In some cases, the method further comprises comparing the intersecting distance to a search distance. In some cases, the method further comprises identifying the closest point of each of the intersecting subareas relative to the examined vertex. In some cases, the edges data are selected from start point and an end point of the edges, or vertices coordinates. In some cases, the photogrammetry data comprises initial suggestions for actual boundaries of subareas in the area included in the initial representation.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
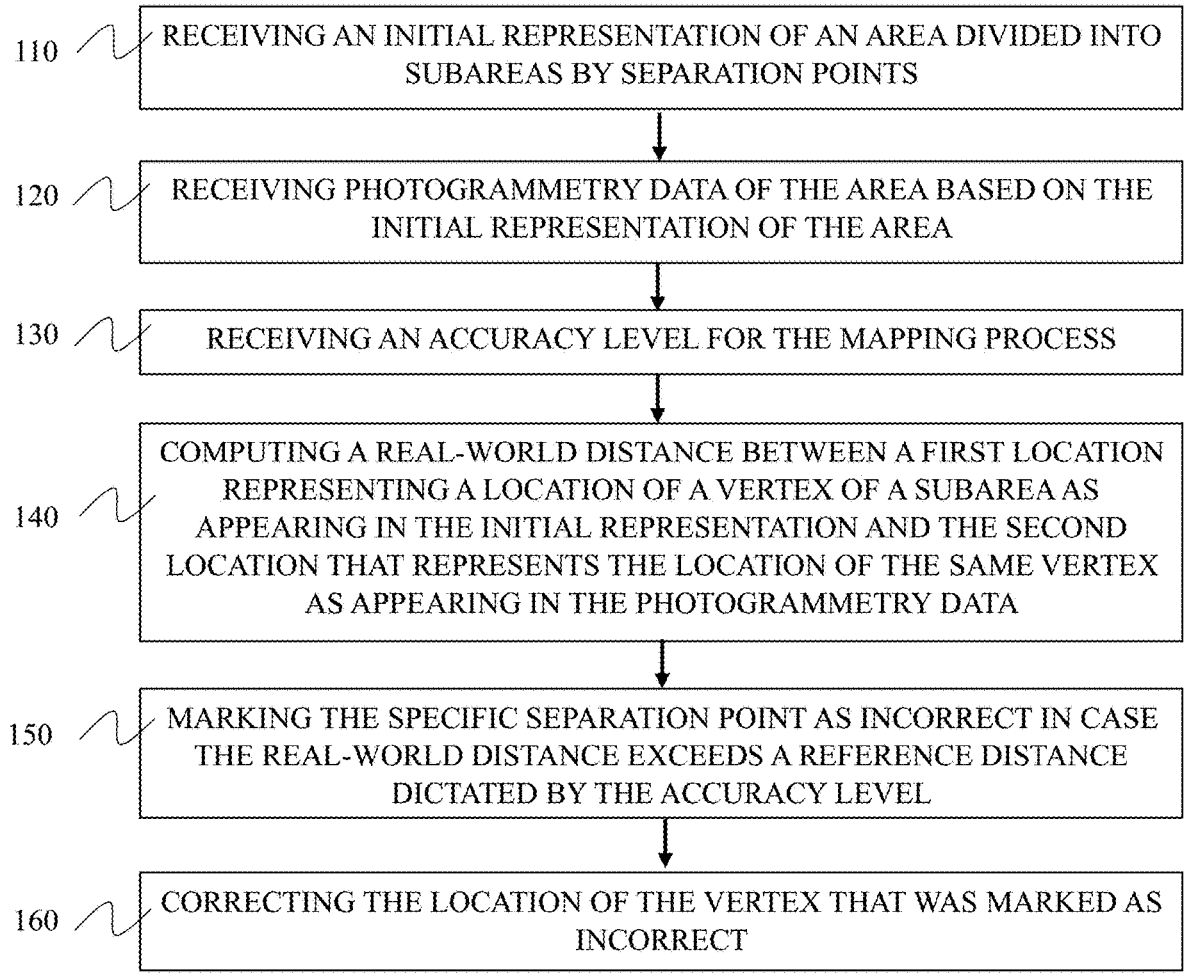
FIG. 1 shows a method for verifying the correctness of digital parcel data, according to exemplary embodiments of the invention.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

A system and method for mapping an area into sub-areas are described herein. The method receives photogrammetric data of the area. The photogrammetric data defines an initial representation of the area and patterns of electromagnetic radiant imagery. Methods are also described herein for identifying errors in the geometric representation of parcels that were created based, partly, on photogrammetric data. The errors may include an erred location of a line defining a border of a subarea, the location of a vertex, and the like. The methods may also comprise correcting the errors as elaborated below. This way, the area mapped into subareas lacks errors such as areas between subareas that are not assigned to any subarea as well as others In general, geometric parcel data includes edges that define boundaries or borders of subareas. The edges are defined by a list of points, the points are defined by their location, such as coordinates, relative location compared to a reference point, and the like. The geometric parcel data is stored in a memory accessible to the computing machine that performs the processes described below. The computing machine may be a physical electronic device such as a laptop, tablet, server, and the like. The computing machine may be a virtual machine operating on a physical device, such as a machine operating on Google cloud, Microsoft Azure and the like.

Quality assurance procedures are used to identify and correct errors introduced into the Geometric parcel data during the creation of the Cadaster parcels database. Four types of checks include:

1. Positional Accuracy—refers to the accuracy of the location of features or objects relative to their actual locations on the earth's surface. It is a measure of how closely the represented locations match the real-world locations.

2. Geometric completeness—refers to the completeness of the geometric representation of features or objects. It means that all necessary components of a feature or object, such as vertices, arcs, and polygon boundaries, are present and correctly connected.

3. Logical Consistency—refers to the consistency of the relationships among the features or objects.

4. Usability—refers to the ease of use of the GIS dataset for its intended purposes. This includes aspects such as the ability to search for and retrieve data, the clarity of the data representation, and the ability to integrate the data with other datasets. A usable GIS dataset must meet the specific needs of the user and provide relevant and reliable information.

The quality assurance process begins with the definitions of the rules to be executed. These rules can be inputted automatically, for example, based on a set of properties related to the mapped area, or inputted by a person managing the quality assurance process, for example via a user interface coupled to the computing machine.

FIG. 1 shows a method for verifying the correctness of digital parcel data, according to exemplary embodiments of the invention.

The process below is aimed at minimizing gaps between a vertex stored in the parcel data and the same vertex as appearing in the photogrammetric data. The location of both vertices—for example, defined by coordinates—should be identical or closer than a threshold defined in the rules. Persons or computerized machines are thus able to use photogrammetric data in order to define the limits of a certain property, based on pre-defined rules. These limits are used to establish the Parcel and its boundaries.

Step 110 discloses receiving an initial representation of an area divided into subareas by separation points. The separation points define the boundaries of the subareas, for example points that define the edges of each subarea. The initial representation of the surveyed area may be provided from an aerial survey, such as drones or other aerial vehicles. The accuracy level of the initial representation, such as satellite imagery, radar measurements, and the like, or video may be limited by the equipment used by the aerial vehicle. For example, the accuracy level may be in the range of 5 cm-7.5 cm GSD (Ground Sampling Distance)—resulting in an accuracy greater than 1:500 scale.

Step 120 discloses receiving photogrammetry data of the area based on the initial representation of the area. The photogrammetric data may be created in an autonomous manner using a computer program operating on a computing machine or device. The photogrammetric data may be created by a person operating computer software. The person or software may use the initial representation of the area in order to create the photogrammetric data that represents the area. The photogrammetric data may contain a two-dimensional or three-dimensional model of the objects identified in the initial representation of the area.

The photogrammetry data comprises initial suggestions for the actual boundaries of subareas in the area included in the initial representation, or boundaries of a property element or a construction element (warehouses, buildings, utility poles, public gardens, pavements, roads) based on aerial and field surveys. This photogrammetry data can be used in a national or regional cadaster parcels database.

Step 130 discloses receiving an accuracy level for the mapping process. The accuracy level may define an allowed distance between two or more separation points. The accuracy level may be inputted by a user of a computer machine, for example via a user interface. The accuracy level may be inputted by the computer software based on measurable attributes such as location, buildings' density in the area and the like. The accuracy level is aimed to prevent gaps between a first location of a parcel vertex and the second location of the same vertex, as provided by the photogrammetric data. In optimal conditions, the two locations should be identical.

The accuracy level may be defined by one or more adjustable parameters, such as: 1. Lower Threshold Distance—a value that represents the level of accuracy of the Photogrammetric mapping. When the distance between the locations in the photogrammetry data and the location of the vertex in the initial representation is lower than the threshold distance, the parcel's/photogrammetry vertices will be considered identical. 2. Maximum allowed Gap—the allowed distance between a vertex location in the initial representation and a Photogrammetry object vertex. In case the distance is greater than a specified threshold, an error will be recorded for the operator later examination.

Step 140 discloses computing a real-world distance between a first location representing a location of a vertex of a subarea as appearing in the initial representation and the second location that represents the location of the same vertex as appearing in the photogrammetry data. The distance is an aerial distance. The computation is performed by computer software or another electronic device capable of receiving location-based data such as coordinates or distance from a reference point and computing a distance based on the location-based data.

Step 150 discloses marking the specific separation point as incorrect in case the real-world distance exceeds a reference distance dictated by the accuracy level.

Step 160 discloses correcting the location of the vertex that was marked as incorrect. Correcting the location may comprise computing the real-world distance in the new location of the vertex in the photogrammetry location.

Figure 2:
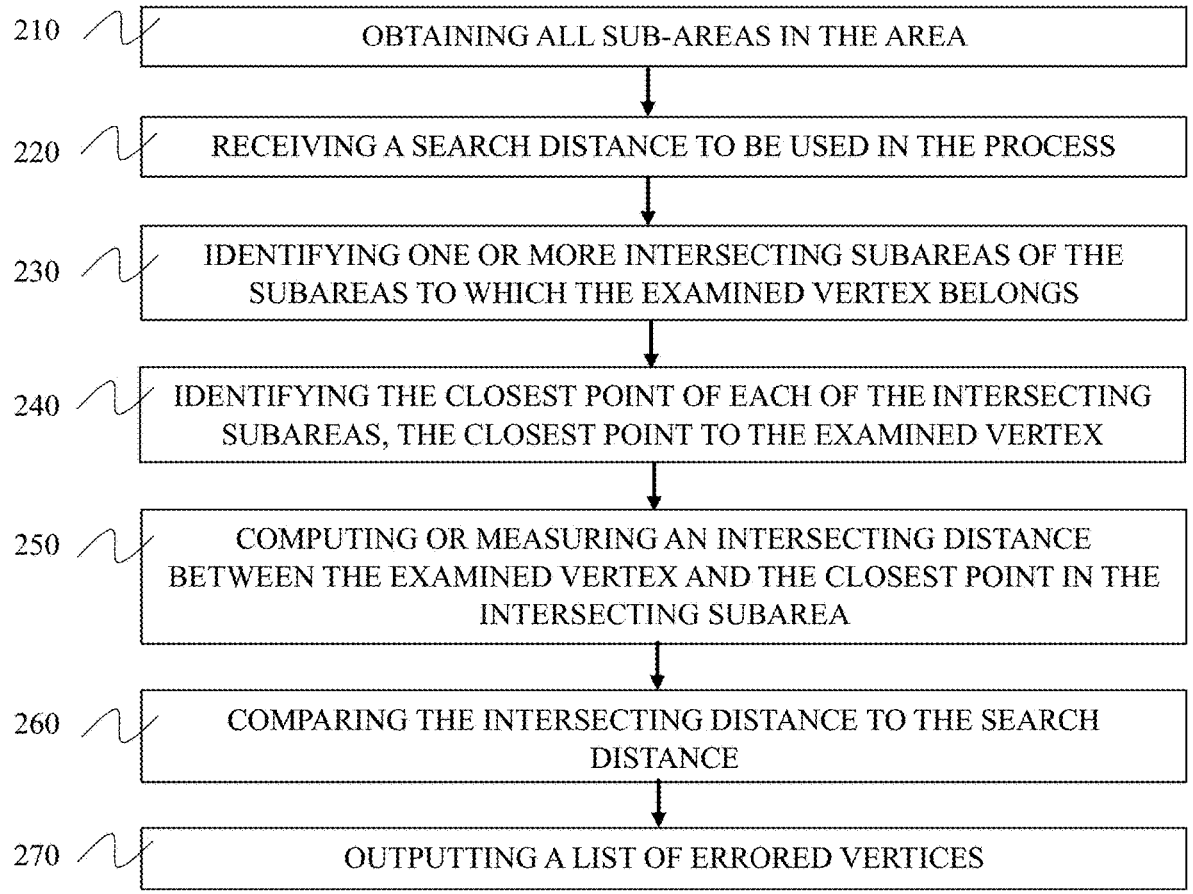
FIG. 2 shows a method for verifying that all the area is allocated to subareas, according to exemplary embodiments of the invention.

FIG. 2 shows a method for verifying that all the area is allocated to subareas, according to exemplary embodiments of the invention.

Step 210 discloses obtaining all sub-areas in the area. The subareas are defined by coordinates of points included in edges that define the borders of the subareas. The subareas may also include an identifier. The subareas may also include a list of intersecting subareas. For example, subarea #1 comprises 7 edges and intersects with subareas #3, #8, #21, and #15 while subarea #2 comprises 4 edges and intersects with subareas #4, #7, #11, and #15. Subarea #15 intersects with subareas #1, #2, and maybe with more subareas.

Step 220 discloses receiving a search distance to be used in the process. The search distance defines a distance allowed between vertices of one sub area and vertices of an intersecting subarea. Intersecting can be defined as closest subareas to the subarea being checked.

The process is done on a subarea by subarea parcel basis, or randomly among all the vertices in all the subareas.

For each vertex that is examined, the method comprises step 230 of identifying one or more intersecting subareas of the subareas to which the examined vertex belongs. Then, step 240 discloses identifying the closest point of each of the intersecting subareas, the closest point to the examined vertex. The closest point is defined as a point in an intersecting subarea that is closest to the examined vertex.

Then, step 250 discloses computing or measuring an intersecting distance between the examined vertex and the closest point in the intersecting subarea.

Then, step 260 discloses comparing the intersecting distance to the search distance. If the intersecting distance exceeds a threshold, mark the examined vertex as an error. If the intersecting distance is ok, the method proceeds to the next vertex to be checked.

Step 270 discloses outputting a list of errored vertices. The list may include identifiers of the errored vertices. The list may include the subarea to which the errored vertices belong. The list of errored vertices can be later examined by an operator or by a computerized software or model.

Figure 3:
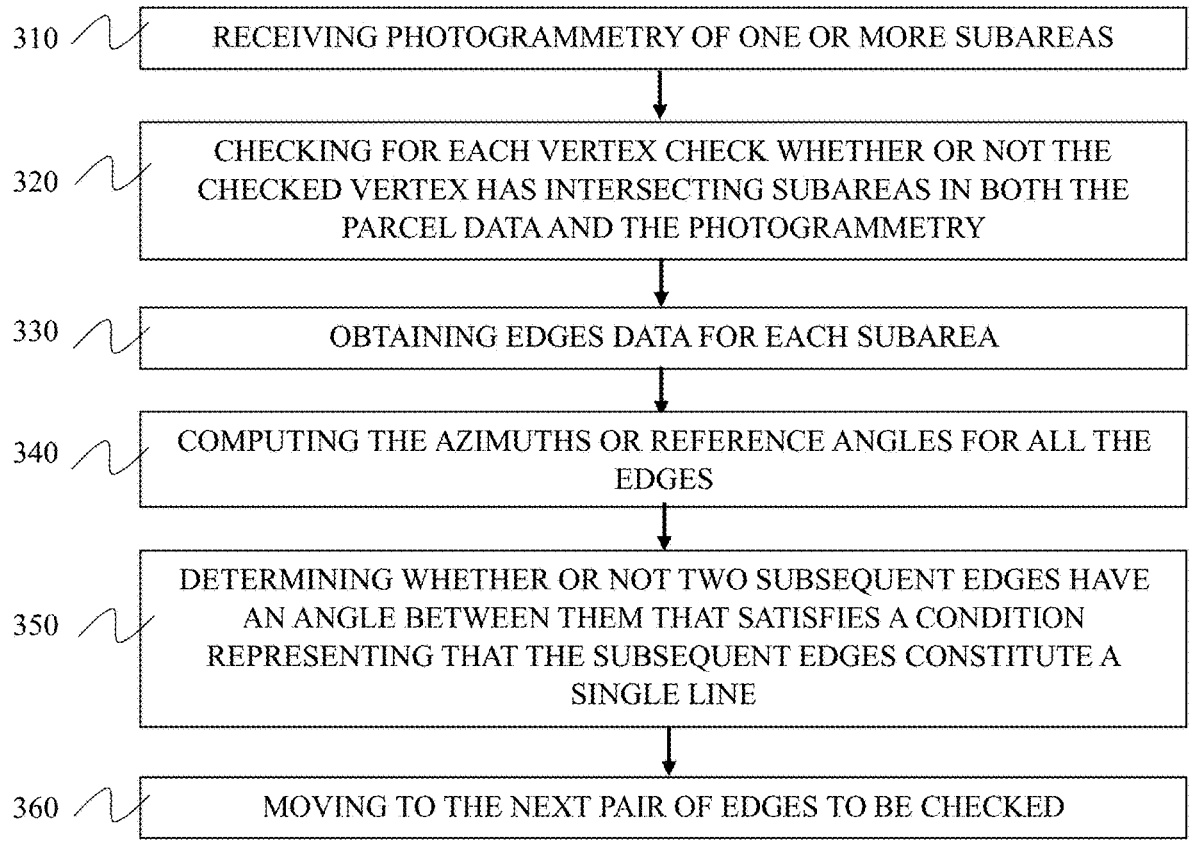
FIG. 3 shows a method for identifying redundant vertices of edges that define subareas, according to exemplary embodiments of the invention.

FIG. 3 shows a method for identifying redundant vertices of edges that define subareas, according to exemplary embodiments of the invention.

The sub-areas are defined by edges that represent a series of points. The edges are defined by at least two points, the start point, and the end point, and an azimuth. for example, a subarea may be defined by seven (7) edges connected to each other in a series. For example, edge 1 is connected to edges 2 and 7, edge 2 is connected to edges 1 and 3, edge 3 is connected to edges 2 and 4, edge 4 is connected to edges 3 and 5, edge 5 is connected to edges 4 and 6, edge 6 is connected to edges 5 and 7 and edge 7 is connected to edges 6 and 1. The exemplary subarea also has 8 vertices that define connection points between subsequent edges—vertex 0 connects edge 7 and edge 1, vertex 1 connects edge 1 and edge 2, vertex 2 connects edge 2 and edge 3, vertex 3 connects edge 3 and edge 4, vertex 4 connects edge 4 and edge 5, vertex 5 connects edge 5 and edge 6, vertex 6 connects edge 6 and edge 7, vertex 7 connects edge 7 and edge 1.

In order to perform the process of identifying redundant vertices, the method comprises identifying subsequent edges, for example, edge 4 and edge 5 that have similar azimuths, such that both edges 4 and 5 can practically be a single edge, and the exemplary subarea above will include only six edges instead of seven edges. The difference value between the azimuths of the subsequent edges is inputted into the device or machine that performs the method. The difference value may change according to the area's properties, such as size, terrain, shape and the like.

Step 310 discloses receiving photogrammetry of one or more subareas. The subareas are defined by the coordinates of the start point and the end point of the edges, or the vertices of each subarea. The coordinates and identifiers of each subarea are inputted into a memory accessible to the computing device or machine that execute the process described herein.

Step 320 discloses checking for each vertex check whether or not the checked vertex has intersecting subareas in both the parcel data and the photogrammetry. Such a check is done by comparing the checked vertex's coordinates with coordinates that represent points included in other subareas, as the coordinates of the other points are stored in the memory used to perform the process.

Step 330 discloses obtaining edges data for each subarea. The edges data may be a start point and an end point of the edges, or vertices coordinates. This way, edges can be defined, and neighboring edges can be defined—whether or not two edges share a vertex. For each parcel, define its edges and define the parcel's neighbors as edges (straight lines)

Step 340 discloses computing the azimuths or reference angles for all the edges. The reference angle defines the edge's relative direction from another straight line.

Step 350 discloses determining whether or not two subsequent edges have an angle between them that satisfies a condition representing that the subsequent edges constitute a single line. For example, in case the azimuth of edge 4 is 75.5 and the azimuth of edge 5, that is a neighboring edge to edge 4, is 75.35, the azimuth difference is 0.15. In case the threshold is 0.3, edges 4 and 5 are defined as a single line and the vertex that connects them is irrelevant and is a candidate for removal from the system's memory.

Step 360 discloses moving to the next pair of edges to be checked.

Figure 4A:
FIGS. 4A and 4B show an aerial survey of an area and photogrammetric interpretation of the same area, according to exemplary embodiments of the invention.
Figure 4B:
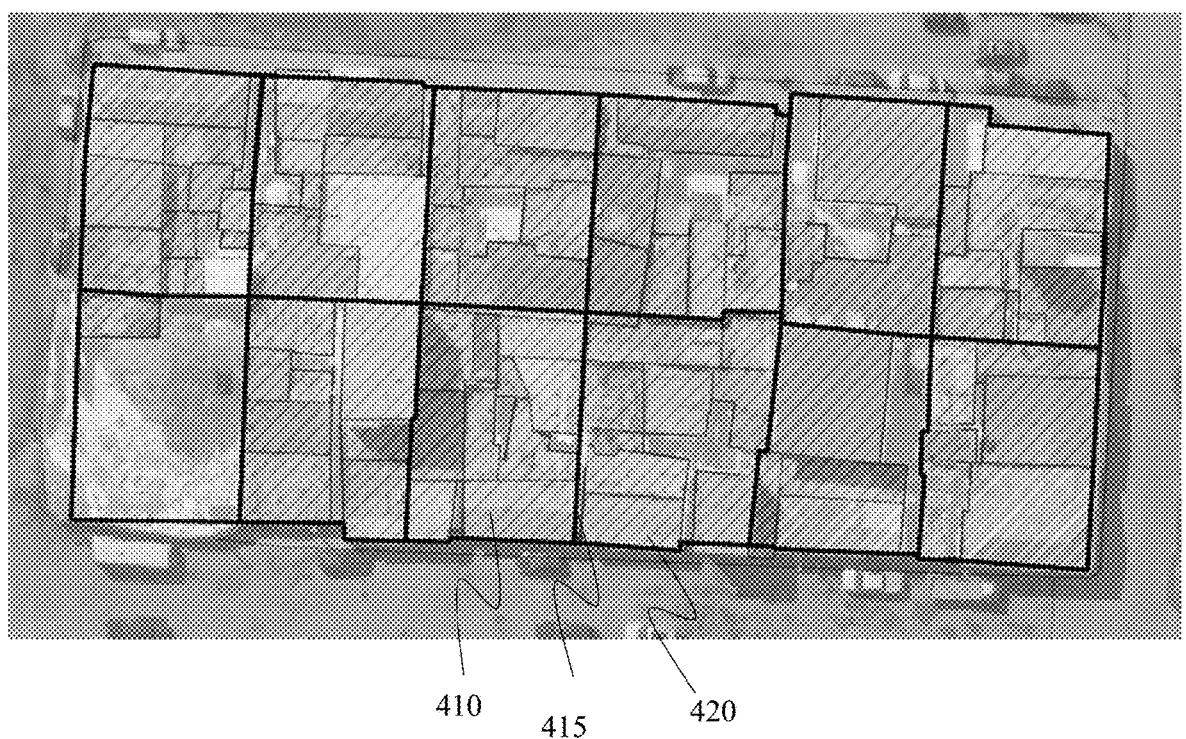

FIGS. 4A and 4B show an aerial survey of an area and photogrammetry of the same area, according to exemplary embodiments of the invention. The aerial survey shown in FIG. 4A is an image captured by an aerial vehicle such as a drone or an airplane. The specific image is captured with 5 cm-7.5 cm GSD (Ground Sampling Distance)—accuracy greater than 1:500 scale. FIG. 4B shows photogrammetry that comprises lines added to the aerial survey. The lines define subareas, for example, subareas 410 and 420 that are included in the area. Line 415 defines a boundary of both subareas 410 and 420. Line 415 may be defined as an edge of both subareas 410 and 420. Line 415 may include separation points that belong to both subareas 410 and 420.

It should be understood that the above description is merely exemplary and that there are various embodiments of the invention that may be devised, mutatis mutandis, and that the features described in the above-described embodiments, and those not described herein, may be used separately or in any suitable combination; and the invention can be devised in accordance with embodiments not necessarily described above.

While the disclosure has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings without departing from the essential scope thereof. Therefore, it is intended that the invention is not limited to the particular embodiments disclosed that are contemplated for carrying out this invention.

What is claimed is:

1. A method for processing photogrammetry data that represents parcels, the method comprising:
   receiving an initial representation of an area divided into subareas by separation points;
   receiving photogrammetry data of the area based on the initial representation of the area;

computing a real-world distance between a first location representing a location of a specific separation point of a specific subarea included in the area as appearing in the initial representation and a second location that represents a location of the same specific separation point as appearing in the photogrammetry data;

defining a specific separation point as incorrect in case the real-world distance exceeds a reference distance dictated by the accuracy level;

for each subarea of the subareas, examine one or more examined vertices:

identifying one or more intersecting subareas of the subarea to which the examined vertex belongs;

measuring a distance between the examined vertex and a closest point in the intersecting subarea;

marking the examined vertex as an error if the intersecting distance exceeds a threshold;

computing the azimuths or reference angles for all the edges defining boundaries of the subarea;

determining whether or not two subsequent edges have an angle between them that satisfies a condition representing that the subsequent edges constitute a single line;

removing a vertex between the two subsequent edges from a list of vertices that define the subarea.

2. The method of claim 1, wherein the initial representation of the area is provided from an aerial survey.

3. The method of claim 1, wherein the photogrammetry data represents initial suggestions for actual boundaries of subareas in the area.

4. The method of claim 1, wherein the accuracy level is defined by one or more adjustable parameters.

5. The method of claim 1, wherein the one or more adjustable parameters comprise a lower Threshold Distance that represents the level of accuracy of the Photogrammetric mapping.

6. The method of claim 1, wherein the one or more adjustable parameters comprise a Maximum allowed Gap representing an allowed distance between a vertex location in the initial representation and a Photogrammetry object vertex.

7. The method of claim 1, further comprising correcting the location of the specific separation point that was marked as incorrect.

8. The method of claim 1, further comprising comparing the intersecting distance to a search distance.

9. The method of claim 1, further comprising identifying the closest point of each of the intersecting subareas relative to the examined vertex.

10. The method of claim 1, wherein the edges data are selected from start point and an end point of the edges, or vertices coordinates.

11. The method of claim 1, wherein the photogrammetry data comprises initial suggestions for actual boundaries of subareas in the area included in the initial representation.

* * * * *